P. D. BREWSTER.
COLOR PHOTOGRAPHY.
APPLICATION FILED JAN. 29, 1914. RENEWED MAY 11, 1916.

1,208,739.

Patented Dec. 19, 1916.

UNITED STATES PATENT OFFICE.

PERCY DOUGLAS BREWSTER, OF EAST ORANGE, NEW JERSEY.

COLOR PHOTOGRAPHY.

1,208,739.  Specification of Letters Patent.  Patented Dec. 19, 1916.

Application filed January 29, 1914, Serial No. 815,153. Renewed May 11, 1916. Serial No. 96,942.

*To all whom it may concern:*

Be it known that I, PERCY D. BREWSTER, a citizen of the United States, residing at East Orange, county of Essex, and State of New Jersey, have invented certain new and useful Improvements in Color Photography, of which the following is a full, clear, and exact description.

This invention relates to color photography, particularly cinematography in colors, and its chief object is to provide an improved method for the purpose.

In accordance with the preferred mode of practising the invention two independent optical images of the object are projected on the opposite sides of two color-sensitized surfaces or emulsions coated on the opposite sides of a suitable plate or film. Such a film or plate is described in my copending applications Ser. No. 747,712, filed February 11th, 1913, and Ser. No. 776,782, filed July 1st, 1913. The image on one side is by preference projected in light predominantly green in color, and the other in light predominantly red. Development and fixation is then effected, converting the two "latent" images into two photographic images which when viewed by transmitted light appear as a single (negative) image with substantially correct gradation and tone-rendering. These images are now colored, preferably in correspondence with the light by which they were produced; that is, one green and the other red. Positives in any number can then be printed from the negative, as described hereinafter.

Figure 1:
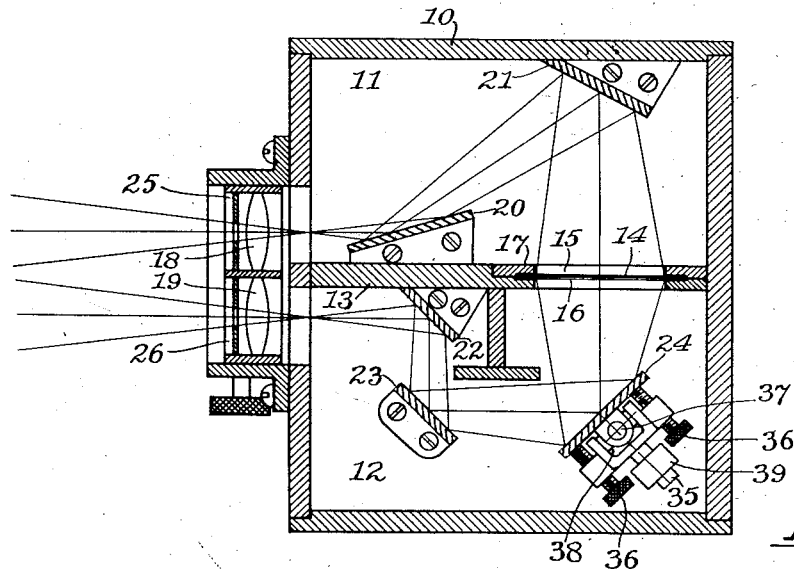
Figure 2:
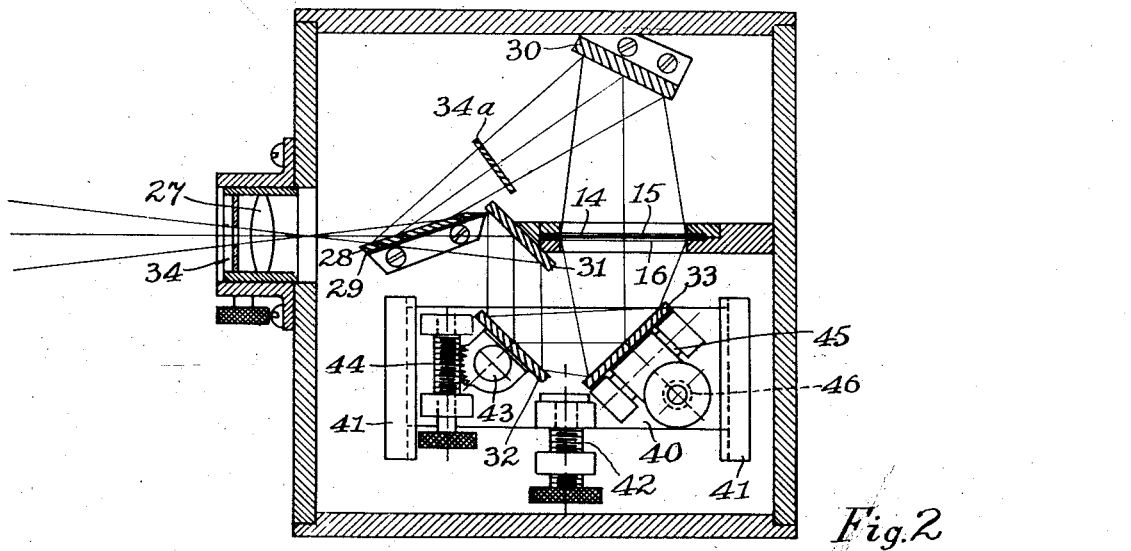

In the accompanying drawing, Figure 1 is a sectional plan view of a camera suitable for use in practising my invention, and Fig. 2 is a similar view of another form, both figures being somewhat diagrammatic in character for the sake of simplicity and clearness.

The camera 10, shown in Fig. 1, is divided into two compartments or chambers, 11, 12, by a partition 13 in which is an opening to receive the film or plate 14 with its two emulsions 15, 16, facing the chambers 11, 12, respectively. In motion picture work a suitable film-gate, indicated diagrammatically at 17, is provided, through which the film is passed by suitable means. As mechanisms for such purpose are well known in the art, it is unnecessary to illustrate the same here.

The two lenses 18, 19, are preferably as nearly as possible of the same focal length and are preferably at equal distances from the plane of the film or plate 14. Rays of light from the object (not shown) are received by the lens 18 and are projected thereby against reflectors 20 and 21 in succession and finally are brought to suitable focus to form an image in the plane occupied by the sensitive coating 15 of the film or plate 14. Similarly, the lens 19, with the help of the interposed reflectors 22, 23, 24, projects rays to form an image in the plane, closely adjacent and parallel to the first-mentioned plane, occupied by the emulsion 16, which image may be, in general, substantially congruent with that on the emulsion 15, subject only to the unavoidable separation of the images due to the thickness of the plate or film 14. To produce congruence, it is evident that the number of reflectors in the case of one image (either one) must be even and of the other odd. By using three reflectors in chamber 12, instead of one, it is possible to keep the lenses 18, 19, close together, thus diminishing the stereoscopic effect incident to the use of two lenses side by side or one above the other. Of course where a stereoscopic effect is sought the lenses may have any suitable separation.

As explained in my co-pending applications above referred to, the emulsions 15, 16, are intended to be affected by light of different colors or groups of colors, for example the first by red, orange, and yellow, and the other by yellow-green, green, blue and violet. For this purpose each emulsion may, by well understood methods, be made sensitive to light of its own color or group of colors and relative insensitive or "blind," to light of the other color or group. As an additional precaution, suitably colored ray filters, as 25, 26, may be used, each being colored to cut out the rays of undesired color or colors. Both emulsions may be sensitive to all colors; or one sensitive to one or more of the colors down to and including, say, green, and greenish yellow, of the spectrum, and the other to one or more of the remaining colors; suitable filters being used in each case to screen out undesired rays. If necessary or desirable the green-sensitive emulsion may be suitably stained or colored to prevent the passage through it of material amounts of rays of the color or colors to which it is sensitive to reduce or even eliminate action by such rays upon the other emulsion. If the two emulsions are not equal in "speed" I prefer to place the film with the slower emulsion facing the chamber having the smaller number of reflectors, as less light is lost therein by reflection.

In photographing near objects the stereoscopic or parallax effect of the two lenses may be too great to give the desired degree of similarity of the two images. I therefore prefer to employ a camera with one lens instead of two, as in Fig. 2 for example. Here the rays from the lens 27 strike a transparent reflector 28 combined with a ray filter 29 (preferably behind the reflector, as shown), so that part of the light is reflected to the mirror 30, and thence to the plane occupied by the emulsion 15, forming an image in said plane and another part, with undesirable rays screened out by the filter 29, is thrown by the reflectors 31, 32, 33 to the plane, closely adjacent and parallel to the first-named plane and occupied by the emulsion 16. Two images in suitable register are thus formed on opposite sides of the film and in the planes occupied by the emulsions 15, 16, respectively. A filter 34 may be used, say in front of the lens, to cut off or reduce the amount of rays which should not go to either emulsion and somewhere in the path of the light which strikes the emulsion 15 may be placed a filter, as 34ª, to screen out rays which should not go to that particular emulsion; the corresponding function for emulsion 16 being performed by filter 29, which, as stated, is preferably combined with the light dividing mirror 28 and arranged at the back thereof.

If the filter 34 (in front of the lens or between the lens and the transparent mirror) is omitted, two filters may be used, in rear of the mirror just mentioned. In such case, using a film whose "green-sensitive" emulsion is substantially or wholly insensitive to red and orange, the filter in the path of the rays which include red would be designed to eliminate or materially diminish the rays above, say, yellow-green of the spectrum, while the other filter, in the path of the rays which include green, would be designed to cut off the ultra-violet rays and diminish the violet (and possibly the blue) so as to give on that side of the film a substantially orthochromatic rendering of those colors. The advantage of this scheme is that the light projected upon the red-sensitive emulsion (which is usually slower than the other) has to pass through but one filter and hence suffers less loss than would be the case if it had to pass through two filters, as in Fig. 2, for example. In each camera the reflectors used may be made of any suitable material, and if they are silvered glass plates the silvering is preferably on the front surface to eliminate double reflection.

In both cameras the distances of the reflectors from each other, from the lens, and from the focal plane, and the angles which they made with each other and with the focal plane and the optical axis of the lens, are of course important conditions to the securement of the desired focus of the image and the desired registration thereof. The reflectors may therefore be permanently fixed in their proper positions; or as many as necessary may be adjustable, at least to a certain degree, so that their positions can be corrected at a later stage of manufacture or after the camera is otherwise completed. As indicative of this possibility and to avoid complicating and confusing the drawing, only one reflector in each camera is shown as adjustable, for example, the reflector 24 in Fig. 1. For this purpose the reflector is mounted on a stem 35 by means of a universal joint provided with adjusting screws 36 by which the reflector may be turned on the pivot 37. Similar screws (not shown) are provided to turn the reflector on the pivot 38. The stem itself is slidable in the support 39 to shift the reflector toward and from the film 14.

Any suitable shutter may be used with either camera, but as such devices are well known it is unnecessary to illustrate the same herein.

After exposure, the film is chemically treated (developed and fixed) in the usual way, to convert into photographic images the "latent" images produced by the light of the optical images which are projected upon the two emulsions. I then have two negative images of the same object which are in suitable register with each other, one produced by light of one color or group of colors, and the other produced by light of another color or group. For example, suppose the object photographed is a vertical cylinder lighted from one side and bearing circumferential bands of red, green and white, and that one emulsion is sensitive to green only and the other to red only. Then the image on the red-sensitive emulsion would show the red band with correct gradation, would be wholly or almost transparent throughout the green band, and would show the white band by a deposit with a correct scale of gradation and of about the same density as in the case of the red band. On the other hand, the green sensitive emulsion would show the green band by a deposit with a correct scale of gradation, would be almost or entirely blank in the red band, and would show the white band with a correct scale and about the same density as the green band. By transmitted light the two images would combine and exhibit a single or unitary (negative) image with substantially correct gradation and tone-rendering throughout. The two images may therefore be said to be complementary, more or less, in gradation. Instead of "fixing" the negative images they may be converted into positives by reversal, after which they are colored or stained suitable colors, preferably without staining or coloring the blank portions of the emulsion, that is, those portions containing no deposit. The colors chosen depend somewhat upon the color effects desired in the unitary image. For example, if a good rendering of the natural colors of the object is desired, one may be colored green or blue-green, and the other red or orange-red. It is not necessary, in all cases, to have the two colors strictly complementary. If the film is to be used as a negative, it is of course fixed after development. After fixation the negative images are suitably colored with two distinct colors, preferably belonging to the two groups referred to. For example one image may be stained green or blue-green and the other red or orange-red, the blank portions of the emulsions being left uncolored. Any number of positives can now be printed from the negative, as by contact in the usual way, or by projection by means of the camera described herein, the positive film being run through the camera and the negative arranged in front so that the light transmitted through the same will be received by the lens and projected to opposite sides of the positive film inside the camera. The positive film also is coated on both sides, one emulsion being preferably sensitive to a group of colors above and including, say, green of the spectrum, and the other to a group below and including, say, orange, and each being by preference practically inert to colors other than those of its own group. If desired or necessary, the printing light may have its ultra-violet, and some of the violet, or other undesirable rays, screened out by a suitable filter, for example one of a pale yellowish color. In positive printing as by contact, for example, it is evident that the light which acts upon the emulsion on the rear of the positive must pass through the front emulsion. This means that the front emulsion must be transparent enough to permit the given printing light to pass in sufficient amounts to give the desired effect on the rear emulsion or coating. Imperfect transparency, and difference in printing speed, may be compensated for in various ways. For example, if the red-sensitive emulsion is slower and is behind, and the front (green-sensitive) emulsion is imperfectly transparent, exposure to white or green printing light may be long enough to give the desired effect on the front (green-sensitive) emulsion and then continued with red, orange-red or orange, for example, thereby securing the necessary effect on the rear emulsion without materially affecting the green-sensitive emulsion; the desired colors of the printing light being secured preferably by means of suitable filters. I prefer to effect the printing by two differently colored lights, preferably those corresponding to the colors with which the negative images are colored or stained. In any case the light effects on the two emulsions can be made equal, or to any desired degree unequal, by varying the exposure of one or both emulsions, either in duration or in the intensity of the light used, or both.

After exposure the positive is developed and fixed in the usual manner. It then has two positive images which are complementary in gradation, and also orthochromatically if the proper course was taken to that end. As in the case of the negative, the two positive images exhibit by transmitted light a single or unitary image. To produce the desired color effects the positive images are now stained or colored, for example in the same manner as in the case of the positive produced by the reversal of the negative described above.

In the completed positive the two images are separated by the transparent support on which the two emulsions are coated. If the two images are superposed or congruent throughout and are projected by rays converging through the positive to the projecting lens no oblique or non-axial ray will pass through corresponding points in the two images, and hence on the screen the two projected images will not coincide exactly but one will be larger than the other. In other words, the two images on the screen will not produce a "unitary" image. To avoid this, the image next to the source of the aforesaid converging rays must be larger than the other, though congruent therewith at the center; the difference in size being dependent upon the angularity of the converging rays, as will be readily understood. This condition can be obtained in the negative, so as to permit positive printing by contact, by using a lens 25 or 26, in the two-lens camera, of sufficiently greater focal length than the other, or, in either camera, by arranging the film slightly nearer one set of reflectors than the others, or shifting one set of reflectors toward the film. This may, however, impair the focus if the focal length and aperture of the lens or lenses be too great. Advantage may also be taken of the fact that rays of different colors are brought to focus at different distances from a non-achromatic lens, the rule being, as is well known, that the higher the color in the spectrum the nearer to the lens is its focal plane. Hence if the corrections of the lens or lenses used are not such as to produce perfect achromatism but will permit the blue or green image, for example, to be formed nearer the lens than the red or orange image, for instance, adjustment of the film toward one set of reflectors, or vice versa, as explained above, can be made without materially impairing the definiton of the images. For this purpose the two mirrors 32, 33, Fig. 2, are mounted on a slide 30 in guides 41 for sliding adjustment by means of a screw 42. Fig. 2 also illustrates convenient means for varying the angularity of the reflectors 32, 33. Thus mirror 32 can be turned on the axis 43 by a worm 44 and mirror 33 on the axis 45 by a worm 46.

Films made in accordance with the method described are not claimed herein but are described and claimed in my copending applications Ser. No. 843,351 and 855,943, filed June 6, 1914, and August 10, 1914, respectively.

It is to be understood that the invention is not limited to the specific process or method herein specifically described, but may be practised in other ways without departure from its proper spirit and scope.

I claim:

1. In the art of color photography, the method comprising projecting in different colors and upon opposite sides of a film sensitized on both sides independent images of the same object, chemically treating both sides of film to produce photographic images thereon, and coloring the two resulting images in different colors.

2. In the art of color photography, the method comprising projecting in light of one spectral group of colors upon one side of a film sensitized on both sides an image of an object and upon the other side of the film, but in light of a different group of colors, an image of the same object, chemically treating both sides of the film to produce photographic images thereon, and coloring the resulting images in correspondence with the colors of the light with which they were produced.

3. In the art of color photography, the herein described method, comprising projecting on one side of a film sensitized on both sides an image of the object which is to be photographed and upon the other side in light substantially devoid of rays above yellow in the spectrum an image of the same object, chemically treating both sides of the film to produce photographic images thereon, and coloring the two resulting images with different colors, one with a color above red and the other with a color below green in the spectrum.

4. In the art of color photography, the herein described method, comprising projecting in light predominantly green upon one side of a film sensitized on both sides an image of an object which is to be photographed and upon the other side of the film in light predominantly red an image of the same object, chemically treating both sides of the film to produce photographic images thereon, and coloring the resulting images different colors, one with a color above red and the other with a color below green of the spectrum.

5. In the art of color photography, the herein described method, comprising projecting, upon opposite sides of a film sensitized on both sides, centrally congruent but different sized images of the same object, one image being in light of one spectral group of colors and the other in light of another spectral group; chemically treating both sides of the film to produce photographic images thereon; and coloring the two resulting images in different colors.

6. In the art of color photography, the method comprising producing, by projection of independent optical images upon opposite sides of a film sensitized on both sides, and by the action, on one side, of light of spectral group of colors, and, on the other side, by light of another spectral group of colors, latent images in suitable registry with each other; chemically treating both sides of the film to produce photographic images thereon, producing thereby suitably registered complementary photographic images; and then coloring the photographic images in different colors.

7. In the art of color photography, the steps comprising projecting upon opposite sides of a film sensitized on both sides independent optical images in suitable registry with each other and producing, on one side by light of one spectral group of colors, and on the other side by light of another spectral group of colors, latent images in suitable registry with each other; and developing both sides of the film to produce photographic images.

8. In the art of color photography, the herein described method, comprising producing, by projection of independent optical images of the same object, on opposite sides of a film sensitized on both sides, and subsequent chemical treatment, photographic images substantially complementary in gradation, and then coloring the images in different colors.

9. In the art of color photography, the herein described method, comprising projecting independent optical images, of an object to be photographed, on opposite sides of a film sensitized on one side chiefly to rays above red of the spectrum and on the other side chiefly to rays below green of the spectrum; chemically treating both sides of the film to produce photographic images thereon; and coloring the two resulting images in different colors.

10. In the art of color photography the herein described steps, comprising projecting in light predominantly green in color upon one side of a film color-sensitized on both sides and supported with both sides at the same focal plane an image of the object to be photographed and upon the other of said sensitized surfaces an image of the same object in light predominantly red in color and developing the said surfaces to produce two photographic images substantially complementary.

11. In the art of color photography, the herein described steps, comprising supporting at a focal plane a film having both sides sensitized, one sensitive chiefly to rays above red of the spectrum and the other chiefly to rays below green of the spectrum; projecting on opposite sides of the said film independent optical images of the object to be photographed; and developing both sides of the film to produce substantially complementary photographic images.

12. In the art of color photography, the herein described steps, comprising supporting at a focal plane a film having both sides sensitized, one sensitive chiefly to rays above red and the other chiefly to rays below green of the spectrum; projecting upon opposite sides of said film independent optical images of the object to be photographed, one image in light predominantly green and the other in light predominantly red; and converting the two latent images thus produced into photographic images.

13. In the art of color photography, the steps comprising receiving with a suitable lens, light rays from an object to be photographed; dividing into two parts the rays transmitted by the lens; directing the two parts through suitable filters to opposite sides of a film sensitized on both sides to produce on one side a latent image of the object by the action of light of one spectral group of colors and on the other side a latent image of the object in suitable registry with the first image by the action of light of another spectral group of colors; and developing both sides of the film to produce photographic images complementary to each other.

14. In the art of color photography, the steps comprising arranging a film sensitized on both sides in rear of suitable projection means adapted to receive and project light rays; directing one part of the light rays to one side of the film and the other part to the other side of the film to form suitable registered images of the object on the two sides of the film; and developing both sides of the film to produce photographic images complementary to each other.

15. In the art of color photography, the improvement which consists in producing on opposite sides of a film sensitized on both sides, by projection of independent optical images upon the two sides of the film, latent images of an object in suitable registry with each other and complementary to each other; chemically treating both sides of the film to produce complementary photographic images in the same registry as the latent images; and coloring in different colors the images thus produced.

16. In the art of color photography, the method comprising projecting through a filter more or less opaque to rays above yellow-green of the spectrum, and upon one side of a film sensitized on both sides, an image of an object to be photographed, and upon the other side of the film an image of the object in suitable registry with the first image; chemically treating both sides of the film to produce photographic images thereon; and coloring the two sides of the film in different colors.

17. In the art of color photography, the method comprising projecting in light predominantly green upon one side of a film sensitized on both sides an image of an object to be photographed and on the other side of the film in light predominantly red an image of the object in suitable registry with the first image, chemically treating both sides of the film to produce photographic images thereon; and coloring the resulting images in different colors.

18. In the art of color photography, the steps comprising projecting upon one side of a film sensitized on both sides an image of an object to be photographed and upon the other side of the film an image of the subject centrally congruent with but larger than the first image, and producing on one side of the film a latent image by the action of light of one spectral group of colors and on the other side a latent image by the action of light of another spectral group of colors; and developing both sides of the film to produce photographic images centrally congruent but different in size.

19. In the art of color photography, the improvement comprising supporting in rear of an optical projecting system a film having light-sensitive emulsions on its two sides; projecting light from an object and producing thereby optical images in the planes occupied by the two emulsions and in suitable registry with each other; and treating the two emulsions with a suitable developing agent to produce photographic images.

20. In the art of color photography, the improvement comprising supporting in rear of an optical projecting system two light-sensitive emulsions coated on opposite sides of the same film and thereby located in planes separated by the thickness of the film; projecting independent suitably registered optical images upon the separated planes occupied by the two emulsions and producing complementary latent images in the latter; and developing both latent images to produce complementary photographic images in the same registry as the said optical and latent images.

In testimony whereof I affix my signature in the presence of two subscribing witnesses.

PERCY DOUGLAS BREWSTER.

Witnesses:
M. LAWSON DYER,
S. S. DUNHAM.